(12) United States Patent
Koetting et al.

(10) Patent No.: US 9,034,129 B2
(45) Date of Patent: *May 19, 2015

(54) ULTRASONIC WELDING SYSTEM AND METHOD FOR FORMING A WELD JOINT UTILIZING THE ULTRASONIC WELDING SYSTEM

(75) Inventors: William Koetting, Davisburg, MI (US);
Alexander Khakhalev, Troy, MI (US);
Michael Nielson, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 247 days.

This patent is subject to a terminal disclaimer.

(21) Appl. No.: 13/005,685

(22) Filed: Jan. 13, 2011

(65) Prior Publication Data
US 2012/0180929 A1    Jul. 19, 2012

(51) Int. Cl.
*B23K 20/10* (2006.01)
*B29C 65/08* (2006.01)
*B23K 20/12* (2006.01)
*B29C 65/00* (2006.01)

(52) U.S. Cl.
CPC ............... *B23K 20/10* (2013.01); *B23K 20/123* (2013.01); *B29C 66/951* (2013.01); *B29C 65/08* (2013.01)

(58) Field of Classification Search
CPC .... B29C 65/08; B29C 65/081; B29C 65/085; B29C 65/086; B29C 65/087; B29C 65/088; B29C 65/645; B29C 66/951; B29C 66/9511; B29C 66/9512; B29C 66/9513; B29C 66/9515; B29C 66/9516; B29C 66/9517; B23K 20/10; B23K 20/123

USPC ........ 156/64, 73.1, 73.5, 73.6, 352, 358, 360, 156/367, 580.1; 223/110.1, 1.1
See application file for complete search history.

(56) References Cited

U.S. PATENT DOCUMENTS

| 3,140,859 | A | 7/1964 | Scarpa |
| 4,294,392 | A | 10/1981 | Colloff |

(Continued)

FOREIGN PATENT DOCUMENTS

| JP | 6114658 A | 4/1994 |
| JP | 7009169 A | 1/1995 |

(Continued)

OTHER PUBLICATIONS

International Search Report for International Application No. PCT/KR2011/003497 dated Jan. 9, 2012.

(Continued)

*Primary Examiner* — George Koch
(74) *Attorney, Agent, or Firm* — Buckert Patent & Trademark Law Firm, PC; John F. Buckert

(57) ABSTRACT

An ultrasonic welding system and a method are provided. The system includes an ultrasonic welding device having an ultrasonic welding horn. The system further includes a controller generating control signals for inducing the welding device to form a first weld joint. The system further includes a power adjusting unit that induces the ultrasonic welding controller to increase a power level output by the ultrasonic welding controller to the ultrasonic welding device if a first displacement of the welding horn is less than the desired displacement during partial completion of forming the first weld joint, such that upon completion of the first weld joint an ending position of the ultrasonic welding horn is at a desired ending position.

6 Claims, 7 Drawing Sheets

(56) References Cited

U.S. PATENT DOCUMENTS

| | | |
|---|---|---|
| 4,767,492 A | 8/1988 | Fukusima et al. |
| 5,357,423 A | 10/1994 | Weaver et al. |
| 5,371,337 A | 12/1994 | Campbell et al. |
| 5,603,444 A | 2/1997 | Sato |
| 5,919,539 A | 7/1999 | Bisbis et al. |
| 6,150,753 A | 11/2000 | Decastro |
| 7,828,190 B2 | 11/2010 | Saito et al. |
| 8,177,878 B2 | 5/2012 | Heinrich et al. |
| 2002/0031603 A1 | 3/2002 | Miyamoto et al. |
| 2004/0023108 A1 | 2/2004 | Nakanishi et al. |
| 2004/0247931 A1 | 12/2004 | Weihs et al. |
| 2005/0202311 A1* | 9/2005 | Higashino et al. ............ 429/99 |
| 2006/0174994 A1* | 8/2006 | White ......................... 156/73.1 |
| 2006/0225842 A1 | 10/2006 | Darcy et al. |
| 2007/0257087 A1* | 11/2007 | Klinstein et al. ............. 228/101 |
| 2009/0111015 A1 | 4/2009 | Wood et al. |
| 2009/0255979 A1 | 10/2009 | Saito et al. |
| 2009/0297892 A1 | 12/2009 | Ijaz et al. |
| 2009/0297942 A1 | 12/2009 | Jang et al. |
| 2010/0038409 A1 | 2/2010 | Wilden et al. |
| 2010/0276086 A1 | 11/2010 | Oblak et al. |
| 2010/0281681 A1* | 11/2010 | Rourke et al. ............... 29/623.1 |
| 2011/0108181 A1 | 5/2011 | Cai et al. |
| 2011/0114705 A1 | 5/2011 | Matis |
| 2011/0117420 A1 | 5/2011 | Kim et al. |
| 2011/0284169 A1 | 11/2011 | Khakhalev |
| 2011/0287300 A1 | 11/2011 | Byun et al. |
| 2011/0293992 A1 | 12/2011 | Hsu et al. |
| 2011/0300438 A1 | 12/2011 | Khakhalev |
| 2011/0308736 A1 | 12/2011 | Scheuerman et al. |
| 2012/0052364 A1 | 3/2012 | Khakhalev |
| 2012/0111924 A1 | 5/2012 | Makita et al. |
| 2012/0153006 A1* | 6/2012 | Koetting et al. ............... 228/102 |
| 2012/0158168 A1 | 6/2012 | Khakhalev |
| 2013/0042959 A1 | 2/2013 | Khakhalev et al. |
| 2013/0048698 A1 | 2/2013 | Khakhalev |

FOREIGN PATENT DOCUMENTS

| | | |
|---|---|---|
| JP | 2003165161 A | 6/2003 |
| JP | 2005503265 A | 2/2005 |
| JP | 2006212692 A | 8/2006 |
| KR | 20070104904 A | 10/2007 |
| KR | 20070109929 A | 11/2007 |
| WO | 9701432 A | 1/1997 |

OTHER PUBLICATIONS

International Search Report for International Application No. PCT/KR2012/006222 dated Feb. 1, 2013.

U.S. Appl. No. 13/556,411, filed Jul. 24, 2012 entitled "Ultrasonic Welding Assembly and Method of Attaching an Anvil to a Bracket of the Assembly".

* cited by examiner

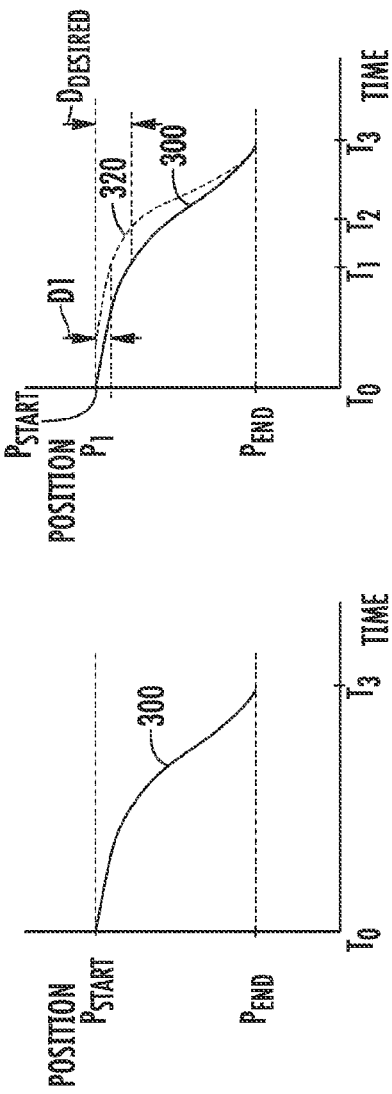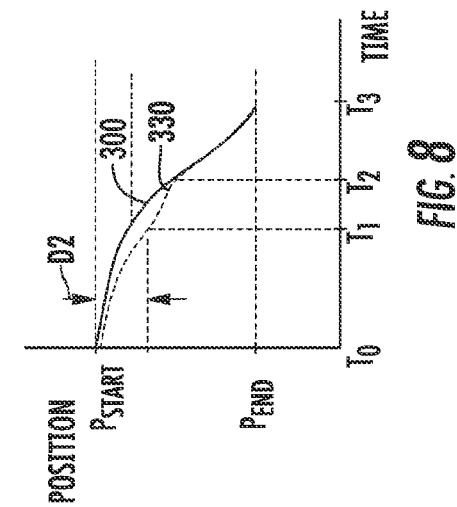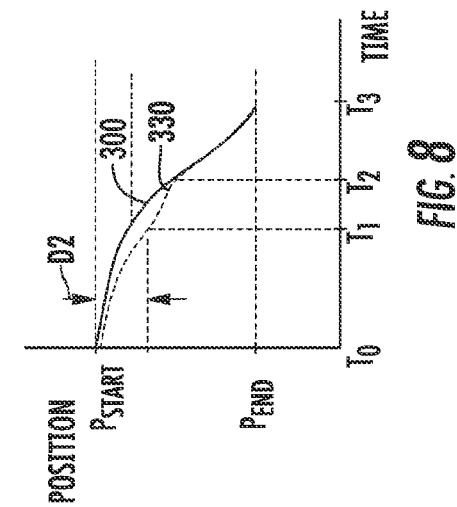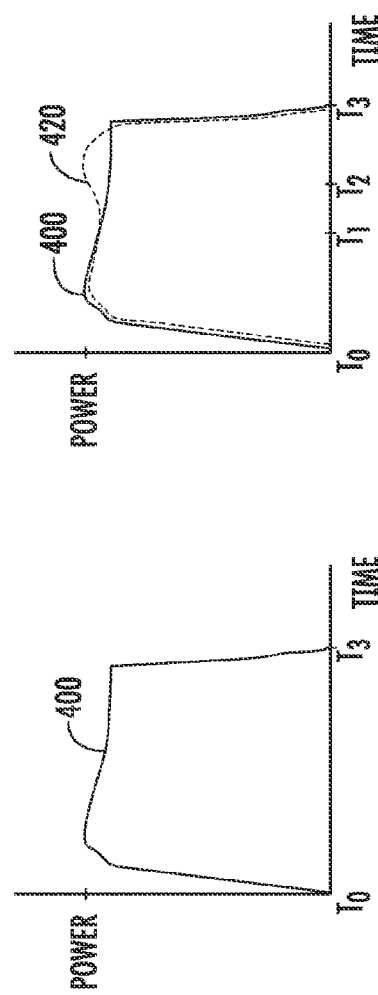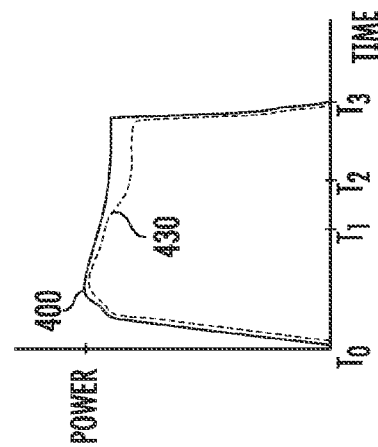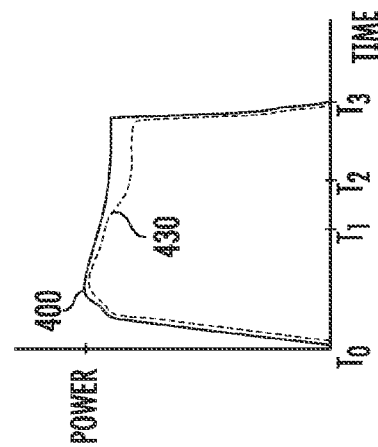

POWER ADJUSTING UNIT INDUCES THE ULTRASONIC WELDING CONTROLLER TO DECREASE THE POWER LEVEL OUTPUT BY THE ULTRASONIC WELDING CONTROLLER TO THE ULTRASONIC WELDING DEVICE AFTER THE SECOND TIME IF THE FIRST DISPLACEMENT IS GREATER THAN THE DESIRED DISPLACEMENT, SUCH THAT UPON COMPLETION OF THE FIRST WELD JOINT AT THE THIRD TIME AN ENDING POSITION OF THE ULTRASONIC WELDING HORN IS AT THE DESIRED ENDING POSITION INDICATED BY THE ULTRASONIC WELDING HORN POSITION CURVE — 514

FIG. 13

ULTRASONIC WELDING SYSTEM AND METHOD FOR FORMING A WELD JOINT UTILIZING THE ULTRASONIC WELDING SYSTEM

BACKGROUND

Ultrasonic welding systems have been utilized to form weld joints. An ultrasonic welding system may undesirably have variability in an amount of total displacement of an ultrasonic welding horn utilized to form weld joints such that the weld joints may not have desired structural and electrical characteristics.

Accordingly, the inventors herein have recognized a need for an improved ultrasonic welding system and a method for forming a weld joint that reduces and/or minimizes the above-mentioned deficiency.

SUMMARY

An ultrasonic welding system in accordance with an exemplary embodiment is provided. The ultrasonic welding system includes an ultrasonic welding device having an ultrasonic welding horn. The ultrasonic welding system further includes an ultrasonic welding controller configured to generate control signals for inducing the ultrasonic welding device to commence forming a first weld joint. The ultrasonic welding system further includes a position sensor operably coupled to the ultrasonic welding horn generating position signals indicative of positions of the ultrasonic welding horn over time. The ultrasonic welding system further includes a power adjusting unit operably communicating with the ultrasonic welding controller. The power adjusting unit has a desired ultrasonic welding horn position curve stored therein indicating desired positions of the ultrasonic welding horn over time for obtaining a desired weld joint. The power adjusting unit is configured to receive the position signals from the position sensor indicating positions of the ultrasonic welding horn when forming a first weld joint. The power adjusting unit is further configured to determine a first displacement of the ultrasonic welding horn utilizing first and second positions of the ultrasonic welding horn at first and second times, respectively, when forming the first weld joint. The power adjusting unit is further configured to determine a desired displacement of the ultrasonic welding horn utilizing third and fourth desired positions of the ultrasonic welding horn from the desired ultrasonic welding horn position curve at the first and second times. The power adjusting unit is further configured to induce the ultrasonic welding controller to increase a power level output by the ultrasonic welding controller to the ultrasonic welding device after the second time if the first displacement is less than the desired displacement, such that upon completion of the first weld joint at a third time an ending position of the ultrasonic welding horn is at a desired ending position indicated by the ultrasonic welding horn position curve.

A method for forming a weld joint utilizing an ultrasonic welding system in accordance with another exemplary embodiment is provided. The ultrasonic welding system includes an ultrasonic welding device with an ultrasonic welding horn, an ultrasonic welding controller, a position sensor, and a power adjusting unit. The method includes generating control signals for inducing the ultrasonic welding device to commence forming a first weld joint, utilizing the ultrasonic welding controller. The method further includes generating position signals indicative of positions of the ultrasonic welding horn over time, utilizing the position sensor. The method further includes accessing a desired ultrasonic welding horn position curve utilizing the power adjusting unit. The desired ultrasonic welding horn position curve indicates desired positions of the ultrasonic welding horn over time for obtaining a desired weld joint. The method further includes receiving position signals from the position sensor at the power adjusting unit. The position signals indicate positions of the ultrasonic welding horn when forming a first weld joint. The method further includes determining a first displacement of the ultrasonic welding horn utilizing first and second positions of the ultrasonic welding horn at first and second times, respectively, when forming the first weld joint, utilizing the power adjusting unit. The method further includes determining a desired displacement of the ultrasonic welding horn utilizing third and fourth desired positions of the ultrasonic welding horn from the desired ultrasonic welding horn position curve at the first and second times, respectively, utilizing the power adjusting unit. The method further includes generating commands to induce the ultrasonic welding controller to increase a power level output by the ultrasonic welding controller to the ultrasonic welding device after the second time utilizing the power adjusting unit if the first displacement is less than the desired displacement, such that upon completion of the first weld joint at a third time an ending position of the ultrasonic welding horn is at a desired ending position indicated by the ultrasonic welding horn position curve.

BRIEF DESCRIPTION OF THE DRAWINGS

FIG. 6 is a graph of a desired ultrasonic welding horn position curve utilized by the power adjusting unit of FIG. 1;

FIG. 7 is a graph of the desired ultrasonic welding horn position curve of FIG. 6 and an exemplary power level curve;

FIG. 8 is a graph of the desired ultrasonic welding horn position curve of FIG. 6 and another exemplary power level curve;

FIG. 9 is a graph of a desired output power level curve utilized by the power adjusting unit of FIG. 1;

FIG. 10 is a graph of the desired output power level curve of FIG. 9 and an exemplary power level curve;

FIG. 11 is a graph of the desired output power level curve of FIG. 9 and another exemplary power level curve; and FIGS. 12 and 13 are flowcharts of a method for forming a weld joint in accordance with another exemplary embodiment.

DETAILED DESCRIPTION

Figure 1:
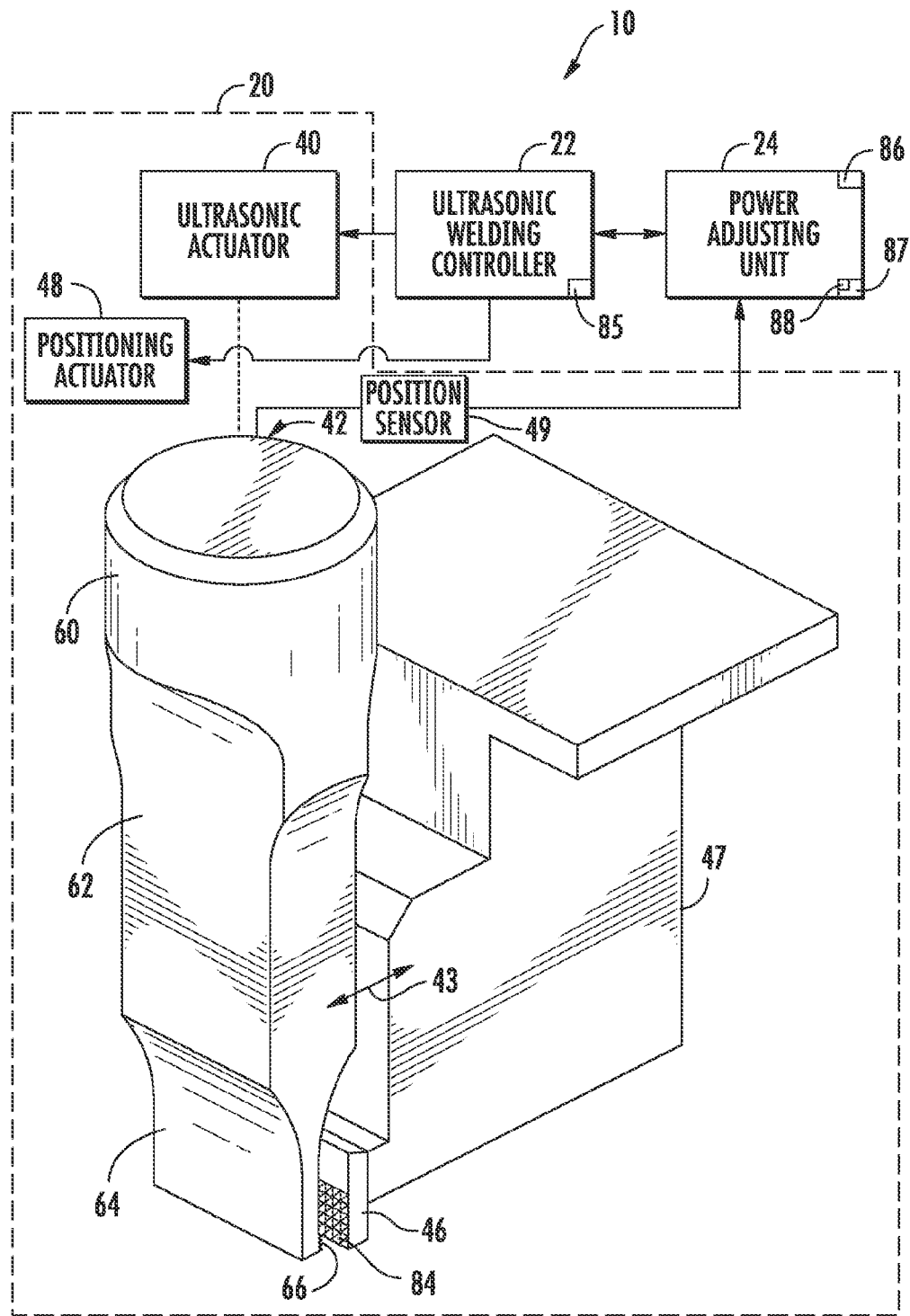
FIG. 1 is a schematic of an ultrasonic welding system having an ultrasonic welding device, an ultrasonic welding controller, and a power adjusting unit, in accordance with an exemplary embodiment.

Referring to FIG. 1, an ultrasonic welding system 10 for forming weld joints in components to couple the components together in accordance with an exemplary embodiment is illustrated. The ultrasonic welding system 10 includes an ultrasonic welding device 20, an ultrasonic welding controller 22, and a power adjusting unit 24. An advantage of the system 10 is that the system 10 utilizes a power adjusting unit 24 that determines actual displacement of the ultrasonic welding horn 42 when forming a weld joint and adjusts the power level of the controller 22 if the actual displacement is less than a desired displacement such that the ultrasonic welding horn 42 is at a desired ending position when the weld joint is formed to obtain a desired weld joint.

For purposes of understanding, a desired weld joint is a weld joint that has desired structural characteristics and electrical characteristics including a desired resistivity and a desired tensile strength for example. In one exemplary embodiment, the system 10 can advantageously produce weld joints having a tensile strength of 400-2000 Newtons with a resistivity in a range of 25-100 micro-ohms with a weld joint surface area range of 50 millimeters$^2$-200 millimeters$^2$. Thus, a weld joint can be formed that has a tensile strength substantially equal to a tensile strength of foil cell terminals which is desirable for cell terminal and weld joint durability. Further, the formed weld joints can withstand vibrational testing of three anticipated life-cycles of the weld joints. Still further, the relatively low resistivity of the weld joint allows battery cells connected in parallel to output a current at least seven-times a normal current capacity while only raising a temperature of the battery cells 20° C. above an ambient temperature.

The ultrasonic welding device 20 is configured to form weld joints in components such as electrical terminals of battery cells. The ultrasonic welding device 20 includes an ultrasonic actuator 40, and ultrasonic horn 42, an anvil 46, a bracket 47, a positioning actuator 48, and a position sensor 49.

The ultrasonic actuator 40 is configured to vibrate the ultrasonic horn 42 in response to receiving control signals from the ultrasonic welding controller 22. The ultrasonic actuator 40 is operably coupled to the ultrasonic horn 42.

The ultrasonic horn 42 is configured to vibrate and to contact an electrical terminal disposed between the horn 42 and the anvil 46 to form one or more weld joints on the electrical terminal. The ultrasonic horn 42 includes a head portion 60, a central portion 62, and a tip portion 64. The head portion 60 is operably coupled to the ultrasonic actuator 40. The central portion 62 is coupled between the head portion 60 and the tip portion 64. The tip portion 64 includes a knurled region 66 that faces the anvil 46. In one exemplary embodiment, the ultrasonic horn 42 is constructed of tool steel such as M2 steel for example.

The anvil 46 is configured to contact the interconnect member 110 when one or more cell terminals of battery cells are disposed between the ultrasonic horn 42 and the interconnect member 110. The anvil 46 includes a knurled region 84 disposed proximate to the ultrasonic horn 42. In one exemplary embodiment, the anvil 46 is constructed of M2 steel. Of course, in alternative embodiments, the anvil 46 could be constructed of other materials known to those skilled in the art. The anvil 46 is operably coupled to the bracket 47 that holds the anvil 46 thereon. In one exemplary embodiment, the bracket 47 can also be constructed of M2 steel. Of course, in alternative embodiments, the bracket 47 could be constructed of other materials known to those skilled in the art.

The positioning actuator 48 is configured to move the ultrasonic horn 42 axially toward the anvil 46 and away from the anvil 46 in response to respective control signals from the ultrasonic welding controller 22. The positioning actuator 48 is operably coupled to the ultrasonic horn 42.

The position sensor 49 is configured to generate position signals indicative of axial positions of the ultrasonic welding horn 42 relative to the anvil 46 along the axis 43 that are received by the ultrasonic welding controller 22. The position sensor 49 is operably coupled to the ultrasonic welding horn 42.

Figure 2:
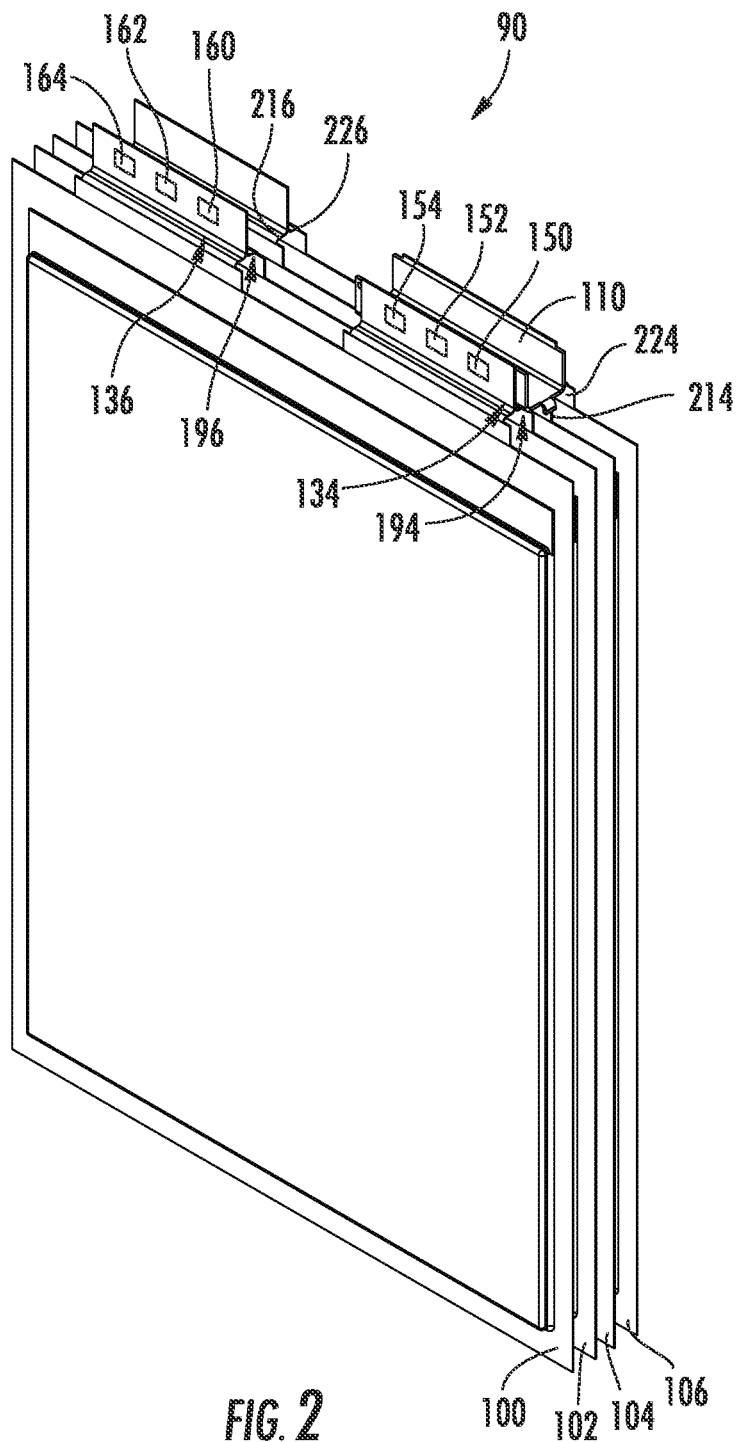
FIG. 2 is a schematic of battery cells having electrical terminals that are coupled together with weld joints.

Referring to FIGS. 1 and 2, during operation of the ultrasonic welding system 10, cell terminals of battery cells and portions of an interconnect member 110 of a battery module 90 are disposed between the knurled region 66 of the ultrasonic horn 42 and the knurled region 84 of the anvil 46. The ultrasonic horn 42 is vibrated and contacts an adjacent cell terminal which forms weld joints in the cell terminals and the interconnect member 110.

Figure 3:
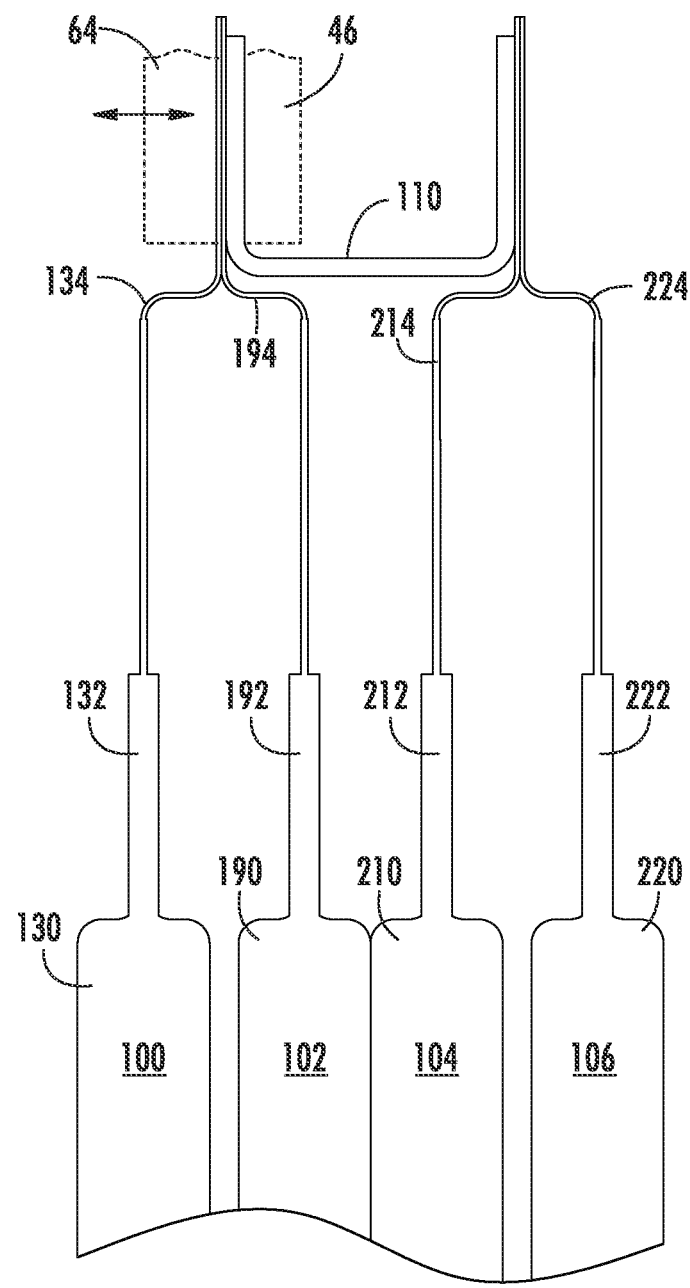
FIG. 3 is a cross-sectional schematic of the battery cells of FIG. 2.

Referring to FIGS. 1-3, in one exemplary embodiment, the battery module 90 includes battery cells 100, 102, 104, 106 that are lithium-ion battery cells. The structure of the battery cells 100-106 are substantially similar to one another. Of course, in alternative embodiments, the battery cells could be other types of battery cells known to those skilled in the art.

The battery cell 100 includes a body portion 130, an extension portion 132 extending around a periphery of the body portion 130, and cell terminals 134, 136 extending outwardly from the extension portion 132. In one exemplary embodiment, the cell terminal 134 is a nickel-plated copper cell terminal and the cell terminal 136 is an aluminum cell terminal.

The battery cell 102 includes a body portion 190, an extension portion 192 extending around a periphery of the body portion 190, and cell terminals 194, 196 extending outwardly from the extension portion 192. In one exemplary embodiment, the cell terminal 194 is a nickel-plated copper cell terminal and the cell terminal 196 is an aluminum cell terminal.

Weld joints 150, 152, 154 formed by the system 10 couple the electrical terminals 134, 194 to the interconnect member 110. Also, weld joints 160, 162, 164 formed by the system 10 couple the electrical terminals 136, 196 to the interconnect member 110.

The battery cell 104 includes a body portion 210, an extension portion 212 extending around a periphery of the body portion 210, and cell terminals 214, 216 extending outwardly from the extension portion 212. In one exemplary embodiment, the cell terminal 214 is a nickel-plated copper cell terminal and the cell terminal 216 is an aluminum cell terminal.

The battery cell 106 includes a body portion 220, an extension portion 222 extending around a periphery of the body portion 220, and cell terminals 224, 226 extending outwardly from the extension portion 222. In one exemplary embodiment, the cell terminal 224 is a nickel-plated copper cell terminal and the cell terminal 226 is an aluminum cell terminal.

Weld joints (not shown) formed by the system 10 couple the electrical terminals 214, 224 to the interconnect member 110. Also, weld joints (not shown) formed by the system 10 couple the electrical terminals 216, 226 together.

Referring again to FIG. 1, the ultrasonic welding controller 22 includes an internal microprocessor 85 configured to generate control signals to induce the ultrasonic welding device 20 to form weld joints. The microprocessor 85 is further configured to generate control signals to induce the positioning actuator 48 to move the ultrasonic horn 42 axially toward the anvil 46 and away from the anvil 46. The microprocessor 85 is further configured to receive control signals from the power adjusting unit 24 to adjust power levels output by the controller 22 to the ultrasonic welding device 20 and in particular to the ultrasonic actuator 40.

Referring to FIGS. 1 and 4-11, the power adjusting unit 24 has a microprocessor 86 operably coupled to a memory device 87. The microprocessor 86 is configured to access a desired ultrasonic welding horn position curve 300 and a desired output power level curve 400 stored in the memory device 87. Referring to FIGS. 6 and 9, data corresponding to the curves 300 and 400 may be stored in the form of operational values of a neural network algorithm 88, or as an electronically accessible table of values, or as an equation in the memory device 87. The desired ultrasonic welding horn position curve 300 indicates desired positions of the ultrasonic welding horn 42 over time. The desired output power level curve 300 indicates desired power levels over time for obtaining a desired weld joint. The time scales of the curves 300 and 400 are identical to one another.

Referring to FIG. 6, the desired displacement of the ultrasonic welding horn 42 for forming a desired weld joint is a difference between a starting axial position ($P_{start}$) of the horn 42 at a time $T_0$ and an ending axial position ($P_{end}$) of the horn 42 at a time $T_3$). The desired ultrasonic welding horn position curve 300 can be empirically generated by the neural network algorithm 88 executing on the microprocessor 86 that generates the data corresponding to the curve 300 based on learned position data obtained from the position sensor 49 during formation of several desired weld joints during a training operational mode of the neural network algorithm 88.

Referring to FIG. 9, an area under the curve 400 corresponds to the total amount of energy typically utilized for forming a desired weld joint. The desired output power level curve 400 can be empirically generated by the neural network algorithm 88 executing on the microprocessor 86 that generates the curve 400 based on learned power level data obtained from the ultrasonic welding controller 22 during formation of several desired weld joints during a training operational mode of the neural network algorithm 88.

After the training operational mode of the neural network algorithm 88, during normal operation when forming weld joints, the microprocessor 86 of the power adjusting unit 24 is configured to receive position signals from the position sensor 49 indicating axial positions of the ultrasonic welding horn 42 when forming the first weld joint (e.g., one or more of the weld joints 150, 152, 154). The microprocessor 86 is further configured to receive data from the microprocessor 85 of the ultrasonic welding controller 22 indicating power levels output by the controller 22 to the ultrasonic welding device 20 when forming the first weld joint.

The microprocessor 86 of the power adjusting unit 24 is further configured to access data corresponding to the desired ultrasonic welding horn position curve 300 stored therein indicating desired positions of the ultrasonic welding horn 42 over a welding time interval (e.g., the time interval $T_0$-$T_3$) for obtaining one or more desired weld joints. The microprocessor 86 of the power adjusting unit 24 also accesses data corresponding to the desired output power level curve 400 stored therein indicating desired output power levels over time for obtaining one or more desired weld joints.

Figure 4:
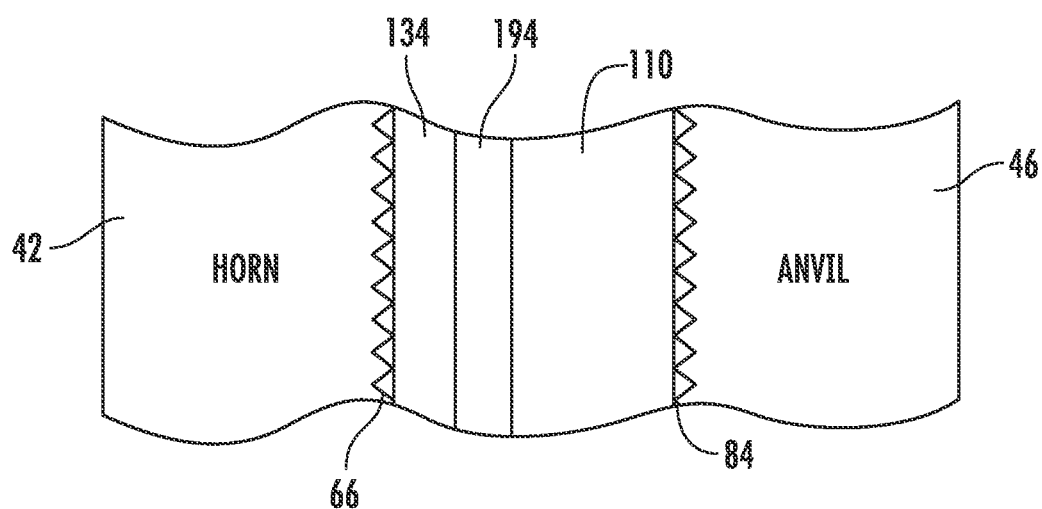
FIG. 4 is a partial cross-sectional schematic of an ultrasonic welding horn and an anvil utilized in the ultrasonic welding device of FIG. 1 when commencing to form a weld joint.
Figure 5:
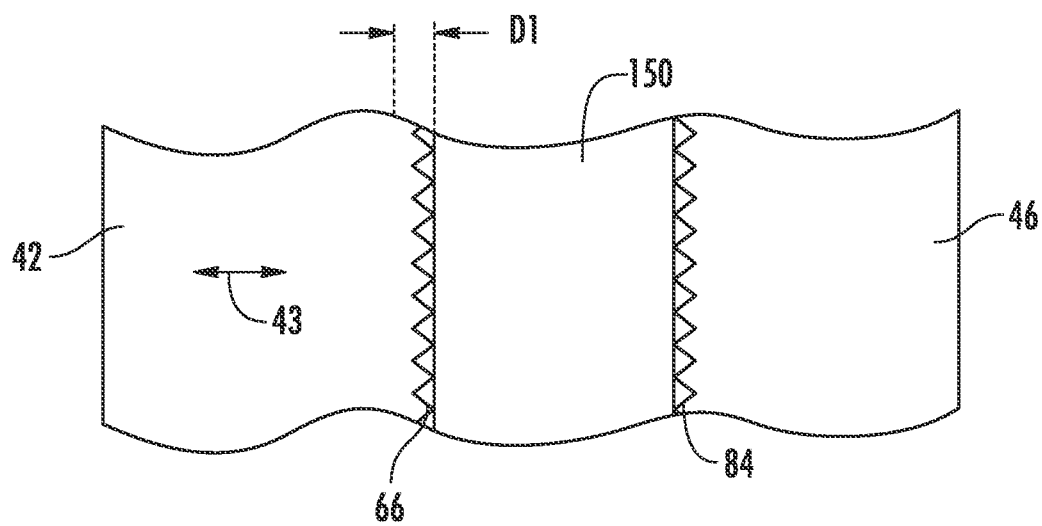
FIG. 5 is a partial cross-sectional schematic of the ultrasonic welding horn and the anvil utilized in the ultrasonic welding device of FIG. 1 indicating movement of the ultrasonic welding horn relative to the anvil.

Referring to FIGS. 4, 5 and 7, the microprocessor 86 of the power adjusting unit 24 is further configured to determine a first displacement $D_1$ of the ultrasonic welding horn 42 along the axis 43 utilizing first and second positions ($P_{start}$ and $P_1$) of the ultrasonic welding horn 42 at first and second times ($T_0$ and $T_1$), respectively. For example, the first displacement $D_1$ can be calculated utilizing the equation: $D_1$=absolute value ($P_{start}$–$P_1$)

The microprocessor 86 is further configured to determine a desired displacement $D_{desired}$ of the ultrasonic welding horn 42 utilizing third and fourth desired positions of the ultrasonic welding horn from the desired ultrasonic welding horn position curve 300 at the first and second times ($T_0$ and $T_1$), respectively. For example, the desired displacement $D_{desired}$ can be calculated utilizing the equation: $D_{desired}$=absolute value (third desired position–fourth desired position).

Referring to FIGS. 7 and 10, the microprocessor 86 is further configured to induce the ultrasonic welding controller 22 to increase a power level output by the ultrasonic welding controller 22 to the ultrasonic welding device 20 after the second time $T_2$, utilizing the neural network algorithm 88, if the first displacement $D_1$ is less than the desired displacement $D_{desired}$, such that upon completion of the first weld joint at a third time $T_3$ an ending position of the ultrasonic welding horn 42 is at a desired ending position $P_{end}$ indicated by the ultrasonic welding horn position curve 300. In particular, referring to FIG. 10, the microprocessor 86 induces the welding controller 22 to increase a power level output (indicated by the curve 420) by the ultrasonic welding controller 22 to the ultrasonic welding device 20 after the second time $T_2$, to greater than an associated value on the curve 400, utilizing the neural network algorithm 88, if the first displacement $D_1$ is less than or equal to the desired displacement $D_{desired}$.

Alternately, referring to FIGS. 8 and 11, the microprocessor 86 is further configured to induce the ultrasonic welding controller 22 to decrease a power level output by the ultrasonic welding controller 22 to the ultrasonic welding device 20 after the second time $T_2$, utilizing the neural network algorithm 88, if the first displacement $D_2$ is greater than the desired displacement $D_{desired}$, such that upon completion of the first weld joint at a third time $T_3$ an ending position of the ultrasonic welding horn 42 is at a desired ending position $P_{end}$ indicated by the ultrasonic welding horn position curve 300. In particular, referring to FIG. 11, the microprocessor 86 induces the welding controller 22 to decrease a power level output (indicated by the curve 430) by the ultrasonic welding controller 22 to the ultrasonic welding device 20 after the second time $T_2$, to less than an associated value on the curve 400, utilizing the neural network algorithm 88, if the first displacement $D_1$ is greater than the desired displacement $D_{desired}$.

Figure 12:
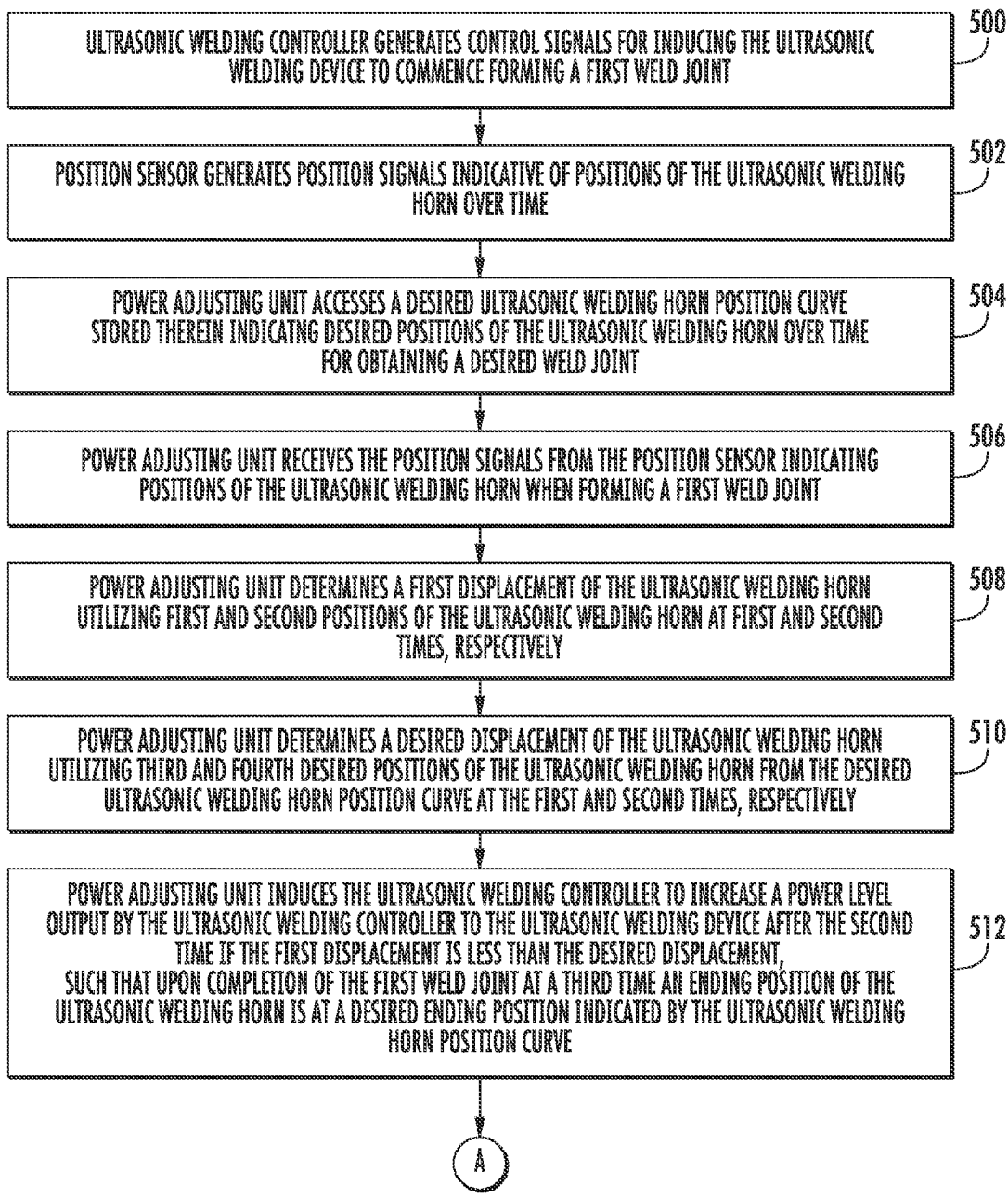

Referring to FIGS. 1 and 12-13, and an overview of a method for forming a weld joint utilizing the ultrasonic welding system 10 in accordance with another exemplary embodiment is provided.

At step 500, the ultrasonic welding controller 22 generates control signals for inducing the ultrasonic welding device 20 to commence forming a first weld joint.

At step 502, the position sensor 49 generates position signals indicative of positions of the ultrasonic welding horn 42 over time.

At step 504, the power adjusting unit 24 accesses a desired ultrasonic welding horn position curve 300 stored therein indicating desired positions of the ultrasonic welding horn 42 over time for obtaining a desired weld joint.

At step 506, the power adjusting unit 24 receives the position signals from the position sensor 49 indicating positions of the ultrasonic welding horn 42 when forming a first weld joint.

At step 508, the power adjusting unit 24 determines a first displacement of the ultrasonic welding horn 42 utilizing first and second positions of the ultrasonic welding horn 42 at first and second times $T_1$, $T_2$, respectively.

At step 510, the power adjusting unit 24 determines a desired displacement of the ultrasonic welding horn 42 utilizing third and fourth desired positions of the ultrasonic welding horn 42 from the desired ultrasonic welding horn position curve 300 at the first and second times $T_1$, $T_2$, respectively.

At step 512, the power adjusting unit 24 induces the ultrasonic welding controller 22 to increase a power level output by the ultrasonic welding controller 22 to the ultrasonic welding device 20 after the second time $T_2$ if the first displacement is less than the desired displacement, such that upon completion of the first weld joint at a third time an ending position of the ultrasonic welding horn 42 is at a desired ending position indicated by the ultrasonic welding horn position curve 300.

At step 514, the power adjusting unit 24 induces the ultrasonic welding controller 22 to decrease the power level output by the ultrasonic welding controller 22 to the ultrasonic welding device 20 after the second time $T_2$ if the first displacement is greater than the desired displacement, such that upon completion of the first weld joint at the third time the ending position of the ultrasonic welding horn 42 is at the desired ending position indicated by the ultrasonic welding horn position curve 300.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

We claim:

1. A method for forming a weld joint utilizing an ultrasonic welding system, the ultrasonic welding system having an ultrasonic welding device with an ultrasonic welding horn, an anvil, an ultrasonic welding controller, a position sensor, and a power adjusting unit, the method comprising:
   generating control signals for inducing the ultrasonic welding device to commence forming a first weld joint in electrical terminals of battery cells when the electrical terminals are disposed between the ultrasonic welding horn and the anvil, utilizing the ultrasonic welding controller;
   generating position signals indicative of positions of the ultrasonic welding horn over time, utilizing the position sensor;
   accessing a desired ultrasonic welding horn position curve utilizing the power adjusting unit, the desired ultrasonic welding horn position curve indicating desired positions of the ultrasonic welding horn over time for obtaining a desired weld joint;
   receiving position signals from the position sensor at the power adjusting unit, the position signals indicating positions of the ultrasonic welding horn when forming a first weld joint;
   determining a first displacement of the ultrasonic welding horn utilizing first and second positions of the ultrasonic welding horn at first and second times, respectively, when forming the first weld joint, utilizing the power adjusting unit;
   determining a desired displacement of the ultrasonic welding horn utilizing third and fourth desired positions of the ultrasonic welding horn from the desired ultrasonic welding horn position curve at the first and second times, respectively, utilizing the power adjusting unit; and
   generating commands from the power adjusting unit that are received by the ultrasonic welding controller directly from the power adjusting unit to induce the ultrasonic welding controller to increase a power level output by the ultrasonic welding controller to the ultrasonic welding device after the second time if the first displacement is less than the desired displacement, such that upon completion of the first weld joint at a third time an ending position of the ultrasonic welding horn is at a desired ending position indicated by the ultrasonic welding horn position curve, and the first weld joint having a tensile strength in a range of 400-2000 Newtons with a resistivity in a range of 25-100 micro-ohms.

2. The method of claim 1, further comprising generating commands to induce the ultrasonic welding controller to decrease the power level output by the ultrasonic welding controller to the ultrasonic welding device after the second time utilizing the power adjusting unit if the first displacement is greater than the desired displacement, such that upon completion of the first weld joint at the third time the ending position of the ultrasonic welding horn is at the desired ending position indicated by the ultrasonic welding horn position curve.

3. The method of claim 1, wherein generating the commands comprises generating the commands to induce the ultrasonic welding controller to increase the power level output by the ultrasonic welding controller to the ultrasonic welding device utilizing a neural network algorithm after the second time utilizing the power adjusting unit if the first displacement is less than the desired displacement.

4. An ultrasonic welding system, comprising:
   an ultrasonic welding device having an ultrasonic welding horn and an anvil, the ultrasonic welding horn and the anvil configured to hold electrical terminals of battery cells disposed adjacent to one another between the ultrasonic welding horn and the anvil;
   an ultrasonic welding controller configured to generate control signals for inducing the ultrasonic welding device to commence forming a first weld joint in the electrical terminals of the battery cells when the electrical terminals are disposed adjacent to one another and between the ultrasonic welding horn and the anvil;
   a position sensor operably coupled to the ultrasonic welding horn generating position signals indicative of positions of the ultrasonic welding horn over time;
   a power adjusting unit operably communicating with the ultrasonic welding controller, the power adjusting unit having a microprocessor operably coupled to a memory device, the microprocessor programmed to access a desired ultrasonic welding horn position curve stored in the memory device, the desired ultrasonic welding horn position curve indicating desired positions of the ultrasonic welding horn over time for obtaining a desired weld joint;
   the power adjusting unit configured to receive the position signals from the position sensor indicating positions of the ultrasonic welding horn when forming a first weld joint;
   the microprocessor of the power adjusting unit further programmed to determine a first displacement of the ultrasonic welding horn utilizing first and second positions of the ultrasonic welding horn at first and second times, respectively, when forming the first weld joint;
   the microprocessor of the power adjusting unit further programmed to determine a desired displacement of the ultrasonic welding horn utilizing third and fourth desired positions of the ultrasonic welding horn from the desired ultrasonic welding horn position curve at the first and second times, respectively; and the microprocessor of the power adjusting unit further programmed to generate commands that are received by the ultrasonic welding controller directly from the power adjusting unit to induce the ultrasonic welding controller to increase a power level output by the ultrasonic welding controller to the ultrasonic welding device after the second time if the first displacement is less than the desired displacement, such that upon completion of the first weld joint at a third time an ending position of the ultrasonic welding horn is at a desired ending position indicated by the ultrasonic welding horn position curve, and the first weld joint having a tensile strength in a range of 400-2000 Newtons with a resistivity in a range of 25-100 micro-ohms.

5. The ultrasonic welding system of claim 4, wherein the microprocessor of the power adjusting unit is further programmed to generate commands to induce the ultrasonic welding controller to decrease the power level output by the ultrasonic welding controller to the ultrasonic welding device after the second time if the first displacement is greater than the desired displacement, such that upon completion of the first weld joint at the third time the ending position of the ultrasonic welding horn is at the desired ending position indicated by the ultrasonic welding horn position curve.

6. The ultrasonic welding system of claim 4, wherein the microprocessor of the power adjusting unit is further programmed to generate commands to induce the ultrasonic welding controller to increase the power level output by the ultrasonic welding controller after the second time utilizing a neural network algorithm if the first displacement is less than the desired displacement.

* * * * *